Patented June 1, 1948

2,442,716

UNITED STATES PATENT OFFICE 2,442,716

PRODUCTION OF ALKYL ACRYLATES

Samuel M. Weisberg and Edwin G. Stimpson, Baltimore, Md., assignors, by mesne assignments, to National Dairy Research Laboratories, Inc., New York, N. Y., a corporation of Delaware No Drawing. Application November 7, 1944, Serial No. 562,400

2 Claims. (Cl. 260—486)

This invention relates to processes for the production of alkene type compounds from corresponding saturated compounds, more particularly to the production of derivatives of unsaturated acids containing an alkenyl group, and especially to the production of acrylic esters.

Alkene compounds are becoming increasingly important in the synthetic rubber, resins, coatings, and plastic industries. Of these compounds, the acrylates have earned a definite position in these industries and as raw materials become more plentiful, it is very likely that their use will expand tremendously. Of the potentially abundant acrylic materials which should loom large in the picture, methyl acrylate, particularly, stands out. Its polymers have been made and tested and found to have many interesting properties. Furthermore, there is a potential source of large amounts of lower alkyl acrylates in byproducts of agricultural and dairy industries. Vast commercial developments of synthetic materials from acrylates derived from these by-products merely await commercially feasible processes for their preparation and exploitation.

Methyl lactate can be produced in large quantities from whey, a by-product of the dairy industries. When methyl lactate is pyrolyzed it does not give methyl acrylate in desirable yields. Therefore, commercially feasible processes for production of methyl acrylate from methyl lactate must be based upon other conversion methods.

It has been proposed heretofore to convert derivatives of acids which contain two or more carbon atoms in addition to the carboxyl of the acid radical and a not readily removable hydroxyl on the alpha-carbon atom, to the corresponding unsaturated derivatives by conversion of the hydroxyl group to a group which is more readily removed upon pyrolysis. Such conversion processes are somewhat hazardous because of difficulties in control and leave much to be desired in economy when operated on a large or commercial scale. For example, it has been proposed heretofore to convert a lower alkyl ester of lactic acid to the corresponding alkoxy compound and then convert this to a lower alkyl acrylic ester by pyrolysis at temperatures in the neighborhood of 400 to 500° C. Such processes are of the batch type and when operated on a large scale, the first step tends to go unevenly with sudden rises in temperature, local overheating and decarboxylation, and sometimes with nearly explosive violence with consequent dangers and low overall yields. Cooling is usually necessary in this step to control the reaction.

Experimental attempts to prepare methyl acetoxypropionate from methyl lactate containing various amounts of sulfuric acid and acetic anhydride by the batch method gave varying results, in many of which the reaction went off very suddenly, giving off a great deal of heat, and in others, it was very, very slow. The yields obtained varied widely for corresponding runs. Traces of impurities markedly affected the reaction, sometimes causing it to go suddenly before mixing was completed. Where the mass was cooled while mixing and then heated, traces of impurities caused very erratic behavior.

Such processes of making unsaturated derivatives also require purification of the alkoxy compound prior to its pyrolysis. In addition, the cracking step has not been carried out heretofore under conditions which are of maximum feasibility from the commercial viewpoint and to obtain optimum yields.

It is an object of the present invention to provide a relatively non-hazardous and readily controllable continuous process for converting lower alkyl esters of lactic or higher alpha-hydroxy aliphatic acids to the corresponding acrylic or higher alpha-unsaturated aliphatic acid esters.

It is another object of the invention to provide a process which requires less equipment than the batch type process.

Another object of the invention is the provision of a process of acylating lactic and similar hydroxy acids in a continuous and easily controlled process to obtain high and uniform yields.

Another object of the invention is to provide a process for pyrolyzing crude alpha-alkoxy aliphatic acid esters with improved yields.

Other objects of the invention will become apparent as it is more fully described hereinafter.

It has been found by experiment that when mixtures of methyl lactate and acetic anhydride are subjected to the influence of various temperatures up to about 260° C. by passage through a tube type reaction chamber no appreciable reaction occurs. Slow, moderate or fast rates of flow through the chamber all gave substantially no methyl acetoxypropionate.

It has been discovered, in accordance with the invention, that by mixing methyl lactate containing a relatively small amount of sulfuric acid, with appropriate amounts of acetic anhydride, and immediately passing the mixture through an elongated reaction chamber that the acetylation may be made to go rapidly, with good yields, and in an easily regulated manner so that by the time the mixture reaches the exit of the reaction chamber the reaction will be completed. The process can be advantageously conducted in a continuous manner and can be readily controlled to give consistently good yields.

It has been discovered furthermore that the overall process of converting an alpha-hydroxy propionyl compound to an acrylyl compound can be very advantageously conducted in a continuous manner and with great saving of labor, materials, heat and equipment, and to obtain high yields.

Thus, in accordance with the invention, for example, substantially equal volumes of methyl lactate and acetic anhydride and a small proportion of sulfuric acid may be continuously mixed at the inlet of an elongated reaction chamber and passed therethrough at a regulated rate of flow. At the start of the process, heat may be supplied to the reaction chamber to start the reaction. Thereafter, the heat evolved by the reaction may be employed to bring the incoming mixture up to the reaction temperature. In some cases a small amount of external heat may be added, but if desired the proportion of sulfuric acid catalyst may be regulated so that the reaction will be substantially completed when the reaction mass has flowed to the exit end of the reaction chamber.

Upon leaving the reaction chamber, the hot reaction mass is continuously passed into an externally heated flashing chamber in which the ingredients, and preferably only the methyl acetoxypropionate and acetic acid, are vaporized. The inherent heat of the reaction mixture is thereby saved and employed in the process. The unvaporized sulfuric acid may be recycled through the elongated reaction chamber and it may be advantageous to recycle a part of the catalyst used in the process, adding only the amount necessary to make up for any loss of catalyst that may have occurred in the cycle. However, due to the relatively low cost of the commercial sulfuric acid used, it is preferred to use fresh sulfuric acid catalyst in the process. The used acid may be sold as fertilizer grade acid.

The hot vapors are passed from the flashing chamber continuously through a pyrolysis chamber where the methyl acetoxypropionate is heated, preferably to an optimum high temperature for a very short time to convert it into methyl acrylate and acetic acid. Upon leaving the pyrolysis chamber, the vapors are continuously passed into a fractionating column in which the methylacrylate is separated. Acetic acid, which is formed in the acetylation as well as the pyrolysis, is also recovered from the fractionation and may be stored and sold as a by-product; or may be continuously passed into a conversion chamber and converted into acetic anhydride, which may continuously be separated and recycled to the elongated reaction chamber.

Thus the hazards and decreased yields due to the sudden spontaneous reactions of large batches of reactants are avoided. The reaction mixture is not permitted to stand in large batches before reacting. Only a relatively very small amount of the ingredients or the reaction mixture is brought up to reaction temperature at any given time in any point in the process.

The heat evolved by the acetylation part of the process can be employed advantageously to bring the incoming reactants to reaction temperature, as has been explained heretofore.

Thus, no added external heating or cooling need be required for this part of the process after the reaction has started. The all-over heat gain may be utilized as a part of the heat needed to bring the mixture up to pyrolysis tempertaure. The speed of the reaction at a given temperature may be controlled by adjusting the relative amounts of acetic anhydride and methyl lactate, but preferably these are fed in the preferred stoichiometric ratio and the temperature regulated by adjusting the rate of flow or the amount of sulfuric acid or both. By this means the temperature may be maintained in the desired range.

The acetylation reaction mixture may be distilled directly to recover purified methyl acetoxypropionate, if desired, and this purified material may be sold as such, stored for further use, or converted into methyl acrylate.

It has been discovered, in accordance with the invention, however, that the acetylated liquors obtained by flashing this reaction product and containing the acetic acid as well as the acetoxypropionate may be subjected directly to pyrolysis and that very good yields of methyl acrylate are thereby obtained. This is contrary to the prior art procedures which have required separation of these ingredients before pyrolysis. Pyrolysis temperatures of the order of about 600° C. or above with contact time of the order of 2 seconds or less are preferred and give the better yields of the acrylate. This eliminates the step of purifying the crude methylacetoxypropionate and achieves a great saving in equipment cost. In addition, the separation of acetic acid is simplified. This reaction can also be advantageously conducted in a continuous manner.

Although pure or commercial sulfuric acid is an efficient and economical catalyst for the acetylation step, it has been found that other catalysts such as chlorosulfonic acid, fluorosulfonic acid, sulfanilic acid, thionyl chloride, or sulfur chloride may be used with satisfactory efficiency. These are all acidic sulfur containing acidic compounds. In this connection, such nonsulfur containing substances as lactic acid, acetic acid, methyl isobutyl ketone, amyl amines, glycine, tyrosine, hydrochloric acid, or commercial 85% phosphoric acid were found to be of no value as catalysts for the continuous process, thus further distinguishing the invention over heretofore proposed non-continuous processes.

As an elongated heat-conducting reaction chamber for the continuous acetylation reaction, a furnace-heat-exchanger consisting of several ¼" grass pipes of total length of 15 ft. and connected by couplings, having a total free volume of 400 cc. and capable of being heated by means of electric currents passed therethrough, has been found to be very convenient. Coupled to this, metering pumps are used to control the rates of flow of the methyl lactate and of the acetic anhydride which were mixed at the inlet of the reaction chamber. Since it is economical and readily available, sulfuric acid was used as a catalyst in most of the runs; it was added to the methyl lactate or acetic anhydride before these two were mixed.

Passing a one to one volume methyl lactate and acetic anhydride mixture containing no catalysts through this reaction chamber at rates of mixture flow varying from 13 cc. per minute to 200 cc. per minute, and at exit temperatures up to about 260° C. gave no reaction.

Upon passing an unheated mixture of methyl lactate containing 2 cc. of 66° Baumé sulfuric acid per gallon and acetic anhydride in equal volumes at a mixture flow rate of 13 cc. per minute, with no external heat applied to the reaction chamber, a spontaneous and self-sustaining reaction occurred, the temperature of the reaction mass at the outlet was about 130° C. The reaction gave an approximately 96% yield of the acetoxypropionate ester. This was determined by titration of the acetic anhydride and acetic acid present, and calculating the acetoxy consumption by difference. In a similar run with a higher rate of flow of the mixture, the outlet temperature did not go over 130° C. and the reaction yield was about 98%.

In a run using methyl lactate containing 1 cc. of sulfuric acid per gallon, an equal volume of acetic anhydride, and a mixture flow rate of 130 cc. per minute in the continuous reaction chamber, a reaction occurred and the outlet temperature rose to 137° C., but the reaction yield was only about 80%. In a similar run using a rate of flow of mixture of 100 cc. per minute the reaction yield was about 90%.

Another run using methyl lactate with 0.7 cc. sulfuric acid per gallon and an equal volume of acetic anhydride, at a total mixture flow rate of 40 cc. per minute with external heat applied to the reaction chamber, a reaction took place and gave close to 100% yields as determined by titration methods. However, if no heat was applied, even after the reaction once started, the reaction dropped off rapidly and the temperature dropped also. The rate of evolution of heat was insufficient to heat the incoming reactants up to the reaction temperature for the concentration of catalyst used. In a similar run using methyl lactate containing 0.3 cc. of sulfuric acid per gallon and an equal volume of acetic anhydride at a mixture flow rate of 40 cc. per minute with external heat applied to the reaction chamber, a reaction took place and gave yields of the order of 70%. However, when the external heat was turned off, the reaction ceased.

The mol ratio of methyl lactate to acetic anhydride of from about 1.0 to 1.0 to about 1.0 to 1.1 may be used, a range of 1.0 to 1.0 to 1.0 to 1.02 being preferred. As to the concentration of sulfuric acid in the reaction mixture, a range of from 0.005% to 0.400% may be used, a range of from 0.15% to 0.060% being preferred. As to the temperatures of the reaction mass at the exit end of the reaction chamber, a temperature in the range of from 100° C. to 260° C. may be used, a range of 100° C. to 140° C. being preferred. Contact times in the reaction chamber of from about 0.1 seconds to about 15 minutes may be effectively used, those in the range of 1 minute to 7 minutes being particularly preferred.

The elongated reaction chamber may be jacketed to avoid heat loss. It may be adapted to be heated by steam. A direct gas heated tube or a steam heated tube would be preferred for plant scale equipment. For a 400 cc. capacity elongated reaction chamber, a rate of flow of about 80 cc. per minute and a commercial 66° Baumé sulfuric acid concentration of from about 0.03% to about 0.045% by weight of the reaction mixture are preferred; that is, a reaction time in the chamber of about 5 minutes is preferred.

To minimize sulfuric acid entrainment problems in the flashing and pyrolyzing steps, it is preferred to operate with as little sulfuric acid as possible, consistent with the desired acetylation reaction speed.

In accordance with the invention, the hot acetylation liquors leaving the elongated chamber were directly flashed in a flashing chamber and the flashed vapors then directly pyrolyzed.

A small elongated cylindrical furnace having the contact surfaces made of red brass was used as a flashing or vaporizing chamber.

A tubular furnace having the contact surfaces made of red brass was used as a pyrolysis chamber. Pyrolysis runs were made using temperatures in the range of 400 to 650° C. and contact times in the range of about 1 to about 13 seconds. When purified methyl acetoxypropionate vapor was pyrolyzed, the yields of acrylate tended to rise with rising temperature and shortened contact time, satisfactory yields were obtained at about 600° C. with 2 seconds contact time.

When flashed acetylation liquor was similarly pyrolyzed in the furnace at similar temperatures and contact times, the yields increased with the elevating of the temperature and the shortening of the contact time; a very satisfactory yield being obtained at 650° C. with a two second contact time. Studies of the maximum reaction yields obtained by varying the contact times, and making adjustments in the temperature to give the maximum yield for the given contact time, show that better yields are obtained from this material at higher pyrolysis temperatures and shorter contact times.

The overall pyrolysis efficiency of conversion of acetylated liquor to acrylate is definitely and appreciably superior to that of conversion of the pure acetoxypropionate.

The pyrolyzed materials were fractionated to give pure methyl acrylate and concentrated acetic acid. In the pyrolysis step, contact times of from five seconds down to ¼ second may be used, those from two seconds down to ½ second being particularly preferred. Temperatures in the range of 600° C. to 750° C. or even higher may be advantageously used, those in the range of 625° C. to 675° C. being preferred. From the economic point of view, it would not be desirable to operate at temperatures above those giving the optimum yield.

The cracking apparatus preferably is in the form of a long tube and the cracking art is well acquainted with the type of apparatus to be used. The diameter and length of the tube can be related to the rate of flow so as to obtain the desired contact time. Means must be supplied to furnish not only the requisite temperature, but if the tube is externally heated the heat used up in the reaction must be transmitted through the tube. Fuel fired furnaces seem to accomplish this better than electrically heated furnaces. If desired, the flashed vapors may be mixed with superheated gases, such as combustion gases, nitrogen, etc., at a temperature and in such proportions that the mixture of the gas and flashed vapors is at the desired temperatures. Preferably means should be supplied for quickly quenching the pyrolysis products to at least below decomposition temperature so as to terminate the reaction promptly.

In the appended claims, the term "lower alkyl" refers to alkyl radicals containing from one to four carbon atoms.

In view of the foregoing disclosures, variations of the invention will be apparent to those skilled in the art either as to the acetylation step or as to the pyrolyzing step or as to combinations thereof. All such modifications or variations within the scope of the appended claims are intended to be included in the invention.

We claim:
1. A continuous process for the preparation of methyl acrylate from methyl lactate which comprises acetylating the methyl lactate with substantially an equi-molar amount of acetic anhydride in the presence of from about 0.03% to about 0.045% by weight of the reaction mixture of commercial 60° Baumé sulfuric acid in an elongated reaction chamber at a reaction temperature in the range of about 100° to 140° C. and at a contact time in the reaction chamber in the range of about 1 to 7 minutes, flashing the resulting acetylation liquor, and directly pyrolyzing the flashed vapor at a temperature in the range of 625° to 675° C. and a contact time in the range of one-quarter second to one-half second.

2. A process of forming methyl acrylate, comprising acetylating methyl lactate with substantially an equi-molar amount of acetic anhydride, vaporizing the resulting acetylation liquor and pyrolyzing the vapor at a temperature in the range of 625° to 675° C. and a contact time in the range of one-quarter second to one-half second.

SAMUEL M. WEISBERG.
EDWIN G. STIMPSON.

REFERENCES CITED

The following references are of record in the file of this patent:

UNITED STATES PATENTS

| Number | Name | Date |
| --- | --- | --- |
| 2,183,357 | Ritchie et al. | Dec. 12, 1939 |
| 2,356,247 | Kirk et al. | Aug. 22, 1944 |
| 2,417,749 | Hagemeyer | Mar. 18, 1947 |

OTHER REFERENCES

Burns et al., "Jour. Chem. Soc." (London) (1935), pages 400–406.

Fein et al., "Ind. and Eng. Chem.," vol. 36 (1944), pages 235–238.

Fisher et al., "Ind. and Eng. Chem.," vol 36 (1944), pages 229–234.

Certificate of Correction

Patent No. 2,442,716.   June 1, 1948.

SAMUEL M. WEISBERG ET AL.

It is hereby certified that errors appear in the printed specification of the above numbered patent requiring correction as follows: Column 4, line 5, for "tempertaure" read *temperature*; line 55, for the word "grass" read *brass*; column 5, line 50, for "0.15%" read *0.015%*; column 6, line 16, after "with" insert *about*; and that the said Letters Patent should be read with these corrections therein that the same may conform to the record of the case in the Patent Office.

Signed and sealed this 27th day of July, A. D. 1948.

[SEAL]

THOMAS F. MURPHY,
*Assistant Commissioner of Patents.*